（12) United States Patent
Bushman et al.

(10) Patent No.: US 9,171,138 B1
(45) Date of Patent: *Oct. 27, 2015

(54) SOFTWARE ACTIVATION AND REVALIDATION

(71) Applicant: STORAGECRAFT TECHNOLOGY CORPORATION, Draper, UT (US)

(72) Inventors: Nathan S. Bushman, Pleasant Grove, UT (US); Douglas Mark Lee, Orem, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,504

(22) Filed: Feb. 2, 2015

Related U.S. Application Data

(63) Continuation of application No. 14/308,302, filed on Jun. 18, 2014, now Pat. No. 8,997,249.

(51) Int. Cl.
*H04L 29/06* (2006.01)
*G06F 15/16* (2006.01)
*G06F 21/10* (2013.01)
*H04L 29/08* (2006.01)

(52) U.S. Cl.
CPC .............. *G06F 21/105* (2013.01); *H04L 67/10* (2013.01); *G06F 2221/0773* (2013.01)

(58) Field of Classification Search
None
See application file for complete search history.

(56) References Cited

U.S. PATENT DOCUMENTS 6,662,284 B2 * 12/2003 Gold ............................ 711/163
6,799,277 B2 * 9/2004 Colvin ........................... 726/22
6,986,063 B2 1/2006 Colvin
7,698,225 B2 4/2010 Rhodes et al.
7,765,604 B2 * 7/2010 Tanaka et al. ................. 726/28

(Continued)

FOREIGN PATENT DOCUMENTS

WO 2004099952 A2 11/2004

OTHER PUBLICATIONS

Trend Micro Incorporated, "Patent Application Titled Method and System for Protecting a Computer System during Boot Operation", Online Article. http://politics-and-government.verticalnews.com/articles/11691584.html.

(Continued)

*Primary Examiner* — Christopher Revak
(74) *Attorney, Agent, or Firm* — Maschoff Brennan

(57) ABSTRACT

Software activation and revalidation. For example, a method for software activation and revalidation may include collecting machine configuration information from a machine on which a software application has been at least partially installed, sending the machine configuration information and a product key to an activation server, applying activation rules to determine whether the product key is valid for the machine configuration information, if the product key is valid for the machine configuration information, activating the software application by sending, from the activation server to the machine, license data that authorizes access to the software application and that contains the activation rules, periodically applying, at the machine, the activation rules to newly-collected machine configuration information to determine whether the product key remains valid for the newly-collected machine configuration information, and if the product key remains valid, revalidating, at the machine, the license data to authorize continued access to the software application.

20 Claims, 3 Drawing Sheets

(56) References Cited

U.S. PATENT DOCUMENTS

| | | | |
|---|---|---|---|
| 8,732,841 | B2 | 5/2014 | Ronning et al. |
| 8,831,228 | B1* | 9/2014 | Agrawal et al. ............... 380/286 |
| 8,997,249 | B1* | 3/2015 | Bushman et al. ............... 726/27 |
| 2002/0188704 | A1* | 12/2002 | Gold et al. ............... 709/221 |
| 2002/0188941 | A1 | 12/2002 | Cicciarelli et al. |
| 2005/0005163 | A1 | 1/2005 | Kirkpatrick et al. |
| 2006/0059099 | A1 | 3/2006 | Ronning et al. |
| 2006/0059100 | A1 | 3/2006 | Ronning et al. |
| 2006/0059561 | A1 | 3/2006 | Ronning et al. |
| 2006/0107256 | A1 | 5/2006 | Zarenin et al. |
| 2006/0173787 | A1* | 8/2006 | Weber et al. ............... 705/59 |
| 2009/0119779 | A1 | 5/2009 | Dean et al. |
| 2009/0300596 | A1 | 12/2009 | Tyhurst et al. |
| 2010/0293536 | A1 | 11/2010 | Nikitin et al. |
| 2010/0325735 | A1* | 12/2010 | Etchegoyen ............... 726/26 |
| 2011/0321172 | A1* | 12/2011 | Maeda et al. ............... 726/27 |
| 2012/0216269 | A1 | 8/2012 | Yeung et al. |
| 2013/0339731 | A1 | 12/2013 | Rowles et al. |
| 2014/0032350 | A1 | 1/2014 | Biswas et al. |
| 2014/0033315 | A1 | 1/2014 | Biswas et al. |
| 2014/0289525 | A1* | 9/2014 | Agrawal et al. ............... 713/171 |

OTHER PUBLICATIONS

"Europe's Leading Provider of Outsourced, Online Store Solutions Enables Secure Electronic Software Distribution With Aladdin HASP SL", Online Article. http://www.prnewswire.com/news-releases/europes-leading-providing-of-outsourced-online-store-solutions-enables-secureelectronic-software-distribution-with-aladdin-hasp-sl-75130922.html.

* cited by examiner

SOFTWARE ACTIVATION AND REVALIDATION

CROSS-REFERENCE TO A RELATED APPLICATION

This application is a continuation of U.S. patent application Ser. No. 14/308,302, filed Jun. 18, 2014, and titled "SOFTWARE ACTIVATION AND REVALIDATION," now U.S. Pat. No. 8,997,249, which is incorporated herein by reference in its entirety.

FIELD

The embodiments disclosed herein relate to software activation and revalidation.

BACKGROUND

Software activation is a license validation procedure required by some proprietary computer software applications. In general, software activation is used to verify the authenticity of a product key and to ensure that the product key is not being used for multiple installations. Upon activation, the software application generally obtains a license that authorizes continued access to the software application by a user on the user's machine for the lifetime of the license.

One common problem associated with software activation involves a user activating a software application on a machine having an initial configuration, and then later attempting to use the license on the same machine but with an updated configuration. For example, a user may initially install a software application on a machine running a lower-priced operating system, and then after activation of the software application the user may upgrade the machine to run a higher-priced operating system. Even though activation of the software application on the higher-priced operating system would require a more expensive license, the user may be able to circumvent paying for the more expensive license using the less expensive license that was already obtained during the prior software activation, notwithstanding the operating system upgrade.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to software activation and revalidation. The example methods disclosed herein may be employed to initially activate a software application by sending machine configuration information and a product key to an activation server and receiving in return license data that contains current activation rules. The example methods disclosed herein then periodically apply the current activation rules, contained within the received license data, to newly-collected machine configuration information in order to determine whether the product key remains valid for the present configuration of the machine on which the software application is installed. Where the product key remains valid, the license data is revalidated, and otherwise the license data is invalidated. In this manner, the example methods disclosed herein can employ activation rules that were current at the time of the software activation, or in some embodiments even more current, to revalidate or invalidate license data, thus preventing an originally valid license from subsequently being employed by a user in an unauthorized manner.

In one example embodiment, a method for software activation and revalidation includes various steps. For example, the method includes collecting machine configuration information from a machine on which a software application has been at least partially installed. The method also includes sending the machine configuration information and a product key to an activation server. The method further includes applying, at the activation server, activation rules stored at the activation server to determine whether the product key is valid for the machine configuration information. The method also includes, if the product key is valid for the machine configuration information, activating the software application by sending, from the activation server to the machine, license data that authorizes access to the software application and that contains the activation rules. The method further includes periodically applying, at the machine, the activation rules contained in the license data to newly-collected machine configuration information from the machine to determine whether the product key remains valid for the newly-collected machine configuration information. The method also includes, if the product key remains valid for the newly-collected machine configuration information, revalidating, at the machine, the license data to authorize continued access to the software application.

In another example embodiment, a method for software activation and revalidation includes various steps. For example, the method includes collecting machine configuration information from a local machine on which a software application has been at least partially installed. The method also includes sending the machine configuration information and a product key to a remote activation server. The method further includes applying, at the remote activation server, activation rules stored at the remote activation server to determine whether the product key is valid for the machine configuration information. The method also includes, if the product key is valid for the machine configuration information, activating the software application by sending, from the remote activation server to the local machine, a signed license file that authorizes access to the software application and that contains the activation rules. The signing of the signed license file is configured to prevent a user of the local machine from undetectably altering the activation rules contained in the signed license file. The method further includes periodically applying, at the local machine, the activation rules contained in the signed license file to newly-collected machine configuration information from the local machine to determine whether the product key remains valid for the newly-collected machine configuration information. The method also includes, if the product key remains valid for the newly-collected machine configuration information, revalidating, at the local machine, the signed license file to authorize continued access to the software application.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
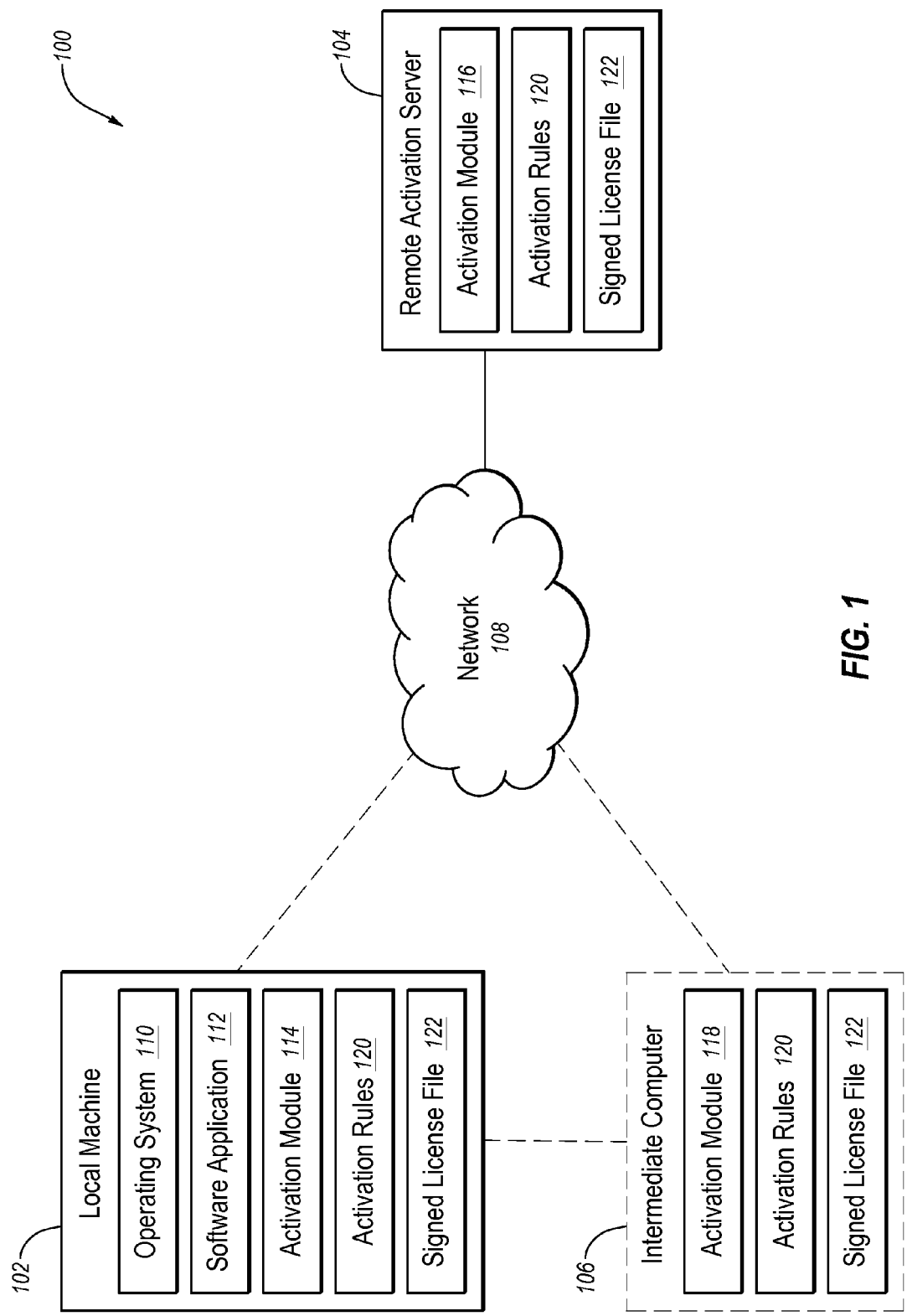
FIG. 1 is a schematic block diagram illustrating an example software activation and revalidation system.

FIG. 1 is a schematic block diagram illustrating an example software activation and revalidation system 100. As disclosed in FIG. 1, the example system 100 includes a local machine 102 and a remote activation server 104. The example system 100 may also optionally include a local intermediate computer 106. The local machine 102 and/or the intermediate computer 106 are able to communicate with the remote activation server 104 over a network 108. The local machine 102 includes an activation module 114, the remote activation server 104 includes an activation module 116, and the intermediate computer 106 includes an activation module 118.

The local machine 102 may be any computing device capable of having a software application 112 installed thereon. For example, the local machine 102 may be a physical computer such as a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, or some combination thereof. The local machine 102 may also be a virtual computer such as a virtual machine. The local machine 102 may also include an operating system 110. The network 108 may be any wired or wireless communication network including, for example, a Local Area Network (LAN), a Metropolitan Area Network (MAN), a Wide Area Network (WAN), a Wireless Application Protocol (WAP) network, a Bluetooth® network, an Internet Protocol (IP) network such as the internet, or some combination thereof.

During performance of the example methods disclosed herein, the activation module 114 may collect a product key and machine configuration information from the local machine 102 prior to, during, or subsequent to the installation of the software application 112. The activation module may then send the product key and the machine configuration information to the activation module 116 of the remote activation server 104, either directly over the network 108 or via the activation module 118 of the intermediate computer 106. The activation module 116 may then apply activation rules 120 stored at the remote activation server 104 to determine whether the product key is valid for the machine configuration information. If the product key is valid for the machine configuration information, the activation module 116 may activate the software application 112 by sending license data, such as a signed license file 122 and the activation rules 120, to the activation module 114 of the local machine 102, either directly over the network 108 or via the activation module 118 of the intermediate computer 106. The signed license file 122 may authorize access to the software application 112. Subsequent to the software activation, the activation module 114 may periodically apply the local copy of the activation rules 120 to newly-collected machine configuration information from the local machine 102 to determine if the product key remains valid for the newly-collected machine configuration information. Where the product key remains valid, the activation module 114 may revalidate the license data. Otherwise, the activation module 114 may invalidate the license data. In this manner, the example methods disclosed herein can employ the activation rules 120 that were current at the time of the software activation, or in some embodiments even more current, to revalidate or invalidate license data, thus preventing an originally valid license from subsequently being employed by a user in an unauthorized manner.

Although only a single intermediate computer 106 is disclosed in FIG. 1, it is understood that more than one intermediate computer may be employed to facilitate communication between the local machine 102 and the remote activation server 104. The use of one or more intermediate computers may be advantageous where the local machine 102 is an offline computer that is not directly accessible to the remote activation server through any network such as the network 108. Further, although the activation rules 120 are disclosed in FIG. 1 as being separate from the signed license file 122, it is understood that in some embodiments the activation rules 120 may be contained in the signed license file 122. In these embodiments, the signing of the signed license file 122 may be configured to prevent a user of the local machine 102 from undetectably altering its contents, including the activation rules 120 contained in the signed license file 122. In particular, the signing of the license file 122 may be accomplished creating a digital signature using a private key in a key pair which is only known to the activation module 116, for example, and appending, prepending, and/or otherwise associating the digital signature to or with the license file 122. This signing then enables the activation module 114 to detect, using a public key in the key pair which is known to the activation module 114, if any changes have been made to the contents of the license file 122. If the contents of the license file 122 have been altered, such as by a user trying to enhance the license contained in the license file 122 or modify the activation rules 120 contained in the license file 122, for example, then the alteration may be detected by the activation module 114 because the digital signature will no longer be valid, and the activation module 114 may then treat the license file 122 as invalid. Also, although the activation module 114 is disclosed in FIG. 1 as being separate from the software application 112, it is understood that in at least some embodiments the activation module 114 may be contained in the software application 112. Further, although the activation modules 114, 116, and 118 are the only modules disclosed in the example system 100 of FIG. 1, it is understood that the functionality of the activation modules 114, 116, and 118 may be replaced or augmented by one or more similar modules residing on the local machine 102, the remote activation server 104, the intermediate computer 106, or another machine or system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
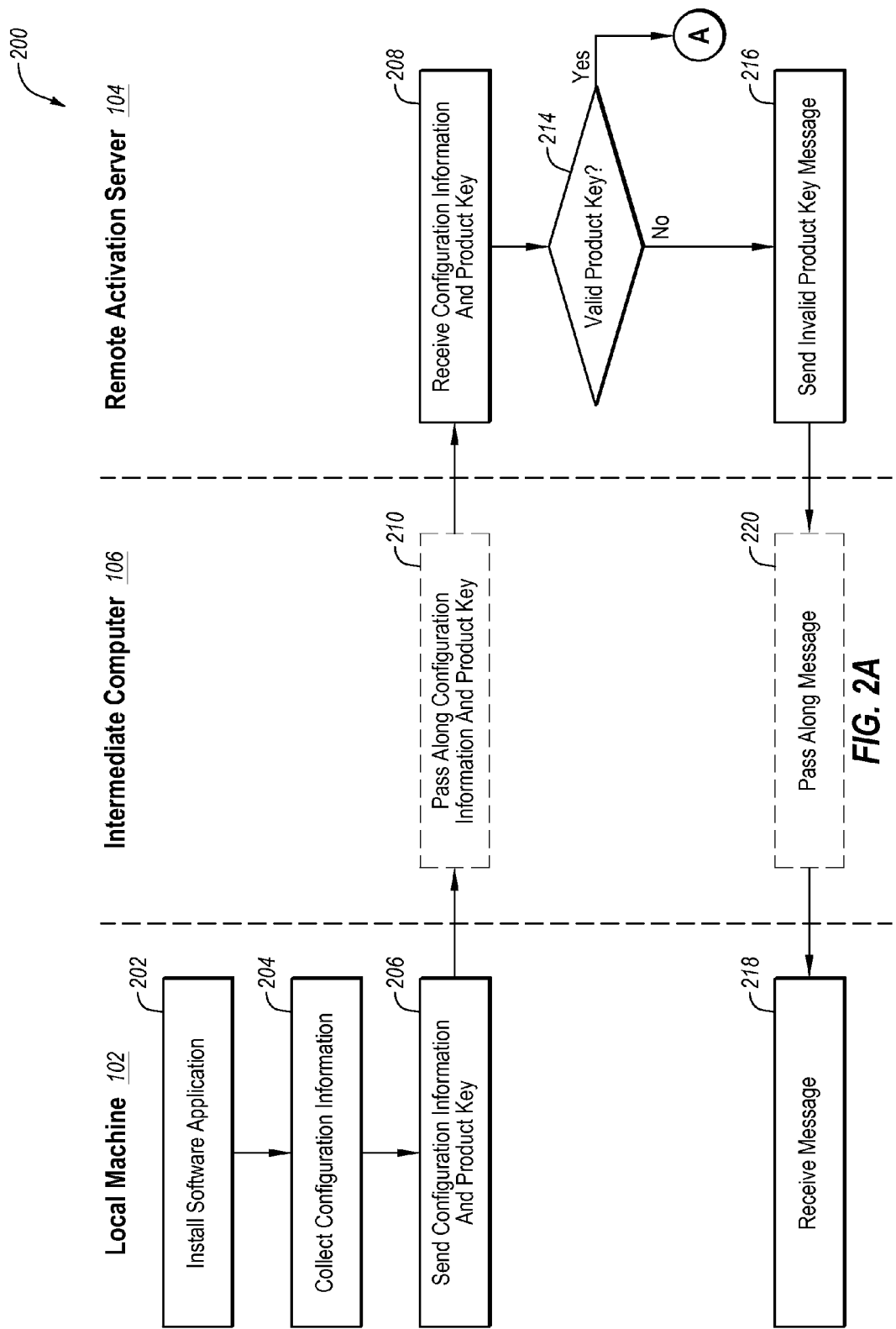
FIGS. 2A-2B are a schematic flowchart diagram of an example method for software activation and revalidation.
Figure 2B:
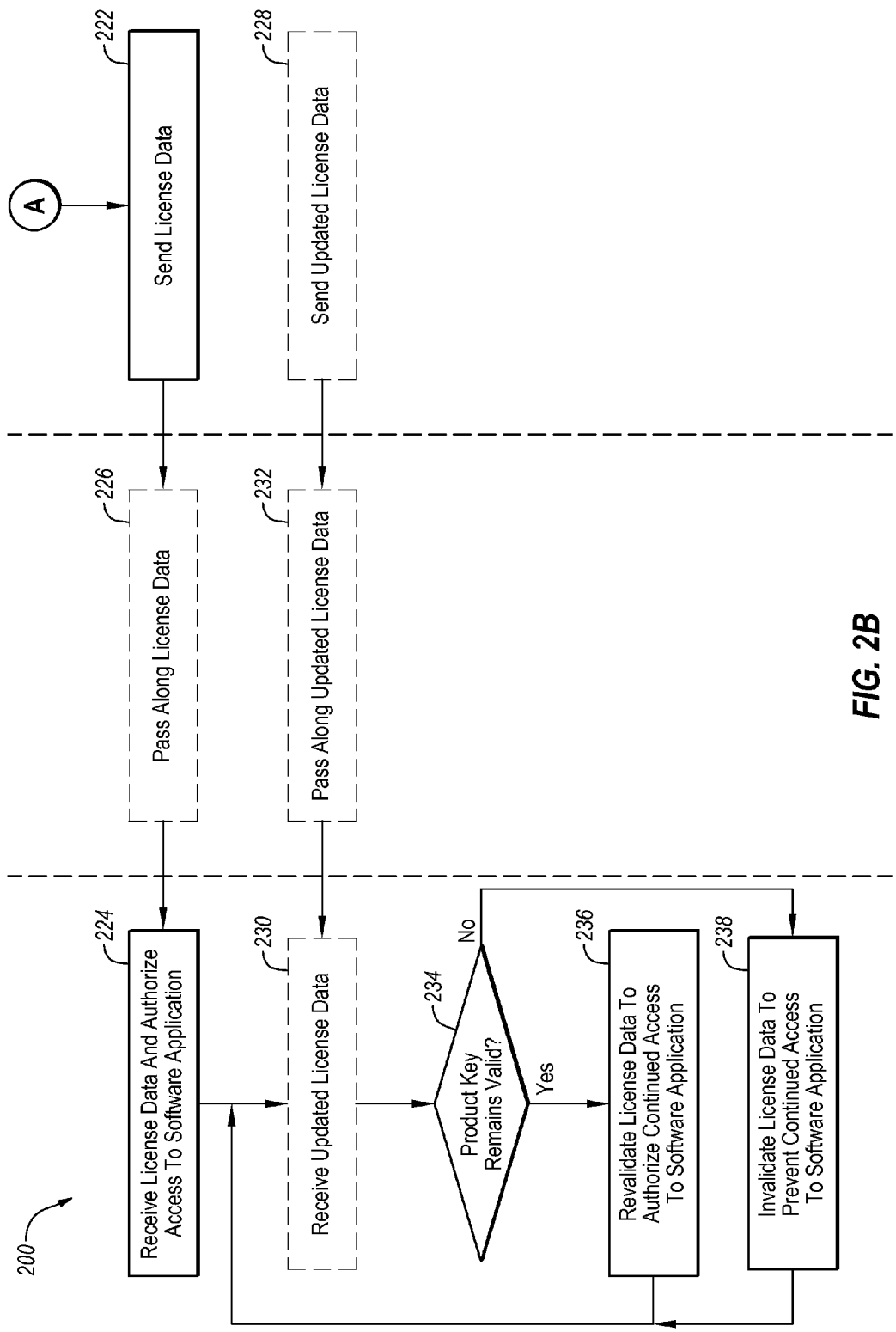

FIGS. 2A-2B are a schematic flowchart diagram of an example method 200 for software activation and revalidation. The method 200 may be implemented, in at least some embodiments, by the activation modules 114 and 116, and optionally 118, of the example system 100 of FIG. 1. For example, the activation modules 114 and 116, and optionally 118, may be configured to execute computer instructions to perform operations of activation of the software application 112 and subsequent and periodic revalidation of license data associated with the activation of the software application 112, as represented by one or more of steps 202-238 of the method 200. Although illustrated as discrete steps, various steps may be divided into additional steps, combined into fewer steps, or eliminated, depending on the desired implementation. The method 200 will now be discussed with reference to FIGS. 1 and 2A-2B.

The method 200 may include a step 202 in which a software application is installed on a local machine. For example, a user of the local machine 102 may, at step 202, install, or at least partially install, the software application 112 on the local machine 102. This installation may also include the installation of the activation module 114, which may be part of the software application 112 or may be a separate module, as disclosed in FIG. 1.

The method 200 may include a step 204 in which machine configuration information is collected. For example, the activation module 114 may, at step 204, collect machine configuration information from the machine on which the software application 112 is installed, which is the local machine 102 in FIG. 1. The machine configuration information may include a variety of information associated with the local machine 102 including, but not limited to, information regarding the operating system 110 installed on the local machine 102, information regarding other software applications installed on the local machine 102, hardware installed on the local machine 102, whether the local machine 102 is a physical computer or a virtual computer, or some combination thereof. This collecting of machine configuration information may also include collecting a product key associated with the software application 112. The product key may be collected using the software application 112, or using a product installer executable associated with the software application 112, such as by prompting a user to enter the product key during installation of the software application 112 or after the expiration of a free trial period subsequent to the software installation.

The method 200 may include a step 206 in which the machine configuration information and the product key are sent and a step 208 in which the machine configuration information and the product key are received, as well as an optional step 210 in which the machine configuration information and the product key are passed along. For example, the activation module 114 of the local machine 102 may, at step 206, send the machine configuration information and the product key and the activation module 116 of the remote activation server 104 may, at step 208, receive the machine configuration information and the product key. Also, the machine configuration information and the product key may first be transferred to the activation module 118 of the intermediate computer 106, via a local connection or manually using a storage device, for example, after which the activation module 118 of the intermediate computer 106 may, at optional step 210, send the machine configuration information and the product key to the activation module 116 of the remote activation server 104. The intermediate computer 106 may be employed in situations where the local machine 102 is not online and not capable of communicating directly with the remote activation server 104, for example.

The method 200 may include a decision step 214 in which it is determined whether the product key is valid for the machine configuration information. For example, the activation module 116 of the remote activation server 104 may, at decision step 214, apply the current activation rules 120 to the machine configuration information and the product key that were received at step 208 to determine whether the product key is valid for the machine configuration information. The activation rules 120 may map, for example, certain product keys to certain authorized machine configurations. In one example embodiment, the activation rules 120 may specify particular operating systems that are authorized for particular product keys. Where the machine configuration information includes information regarding the operating system 110 of the local machine 102, the activation module 116 may apply the activation rules 120 by checking whether the operating system 110 is listed in the mapping as being authorized for the particular product key.

If it is determined at decision step 214 that the product key is not valid for the machine configuration information (No at step 214), then the method 200 may include a step 216 in which an invalid product key message is sent and a step 218 in which the invalid product key message is received, as well as an optional step 220 in which the invalid product key message is passed along. For example, the activation module 116 of the remote activation server 104 may, at step 216, send an invalid product key message and the activation module 114 of the local machine 102 may, at step 218, receive the invalid product key message. Also, the invalid product key message may first be transferred to the activation module 118 of the intermediate computer 106, via the network 108, after which the activation module 118 of the intermediate computer 106 may, at optional step 220, send, via a local connection or manually using a storage device for example, the invalid product key message to the activation module 114 of the local machine 102. In addition, the invalid product key message may be presented to a user, during optional step 220 at the intermediate computer 106 and/or during step 218 at the local machine 102. For example, the invalid product key message may be displayed on a visual display of the intermediate computer 106 and/or on a visual display of the local machine 102.

If it is determined at decision step 214 that the product key is valid for the machine configuration information (Yes at step 214), then the method 200 may include a step 222, in which license data is sent and a step 224 in which the license data is received and access to the software application is authorized, as well as an optional step 226 in which the license data is passed along. For example, the software application 112 may be activated by the activation module 116 of the remote activation server 104, at step 222, sending license data and the activation module 114 of the local machine 102, at step 224, receiving the license data that authorizes access to the software application 112. This activation of the software application 112 may include analysis by the activation module 114 of the local machine 102 of the license data to determine that the activation has been authorized by the activation module 116 of the remote activation server 104. As noted elsewhere herein, the license data may include the signed license file 122 and/or the activation rules 120, as separate data or the signed license file 122 may contain the activation rules 120. Also, the license data may first be transferred to the activation module 118 of the intermediate computer 106, via the network 108, after which the activation module 118 of the intermediate computer 106 may, at optional step 226, send, via a local connection or manually using a storage device for example, the license data to the activation module 114 of the local machine 102.

Continuing with the above example, by the conclusion of step 224 the software application 112 that was installed on the local machine 102 will be activated. In addition, in at least some embodiments the license data received at the local machine 102 at the time of activation will include the current activation rules 120 from the remote activation server 104. This reception of the activation rules 120 that are current at the time of the software activation may enable periodic revalidation of the software application 112, as discussed below in decision step 234, using the activation rules 120 that are more current than any activation rules that may have been included with the files that were used to install the software application 112, such as the files included in a product installer executable. The activation rules 120 stored on the remote activation server 104 may be more current because the activation rules 120 may require periodic updates to account for, among other things, updates to the software application 112, new or updated operating systems, other new or updated software applications, new or updated hardware, new or updated virtual machines or hypervisors, or some combination thereof. For example, when a new version of the operating system 110 is released, which can be a fairly common occurrence, the activation rules 120 on the remote activation server 104 may be updated to account for the new version in the mappings of certain product keys to certain authorized machine configurations. Where updated activation rules 120 can be sent to the local machine 102 at the time of software activation, a new product installer executable with updated activation rules for the software application 112 may no longer need to be released each time that a new version of the operating system 110 is released. Further, where the capability exists for the local machine 102 to periodically communicate with the remote activation server 104, the activation rules 120 may be periodically updated subsequent to the time of the software activation, as discussed below in optional steps 228-232.

The method 200 may include an optional step 228 in which updated license data is sent and an optional step 230 in which the updated license data is received, as well as an optional step 232 in which the updated license data is passed along. For example, the activation module 116 of the remote activation server 104 may, at optional step 228, send updated license data and the activation module 114 of the local machine 102 may, at optional step 230, receive the updated license data. As noted elsewhere herein, the updated license data may include an updated signed license file 122 and/or the updated activation rules 120. Also, the updated license data may first be transferred to the activation module 118 of the intermediate computer 106, via the network 108, after which the activation module 118 of the intermediate computer 106 may, at optional step 232, send, via a local connection or manually using a storage device for example, the updated license data to the activation module 114 of the local machine 102.

The method 200 may include decision step 234 in which it is determined whether the product key remains valid for newly-collected machine configuration information. For example, the activation module 114 of the local machine 102 may, at decision step 234, apply the activation rules 120 that were received by the local machine 102 at step 224 or optional step 230 as part of the license data to newly-collected machine configuration information from the local machine 102 to determine if the product key remains valid for the newly-collected machine configuration information. Decision step 234 may be accomplished by the activation module 114 of the local machine 102 in a similar manner as decision step 214 is accomplished by the activation module 116 of the remote activation server 104, except that the activation rules 120 used in decision step 234 will be stored local to the local machine 102, and may be more current than the activation rules 120 that were used during decision step 214, due to any intervening optional steps 228-232. In addition, the machine configuration information of the local machine 102, which is reflected in the newly-collected machine configuration information, may have changed since the time of decision step 214. For example, where the newly-collected machine configuration information includes information regarding the operating system 110 installed on the local machine 102, if the operating system 110 has been upgraded since the time of the software application from a lower-priced operating system to a higher-priced operating system, the newly-collected machine configuration information would reflect this upgrade to the operating system 110.

If it is determined at decision step 234 that the product key remains valid (Yes at step 234), then the method 200 may include a step 236 in which the license data is revalidated to authorize continued access to the software application. For example, the activation module 114 of the local machine 102 may, at step 236, revalidate the license data that was received at step 224 or optional step 230 in order to authorize continued access to the software application 112. Conversely, if it is determined at decision step 234 that the product key is no longer valid (No at step 234), then the method 200 may include a step 238 in which the license data is invalidated to prevent continued access to the software application. For example, the activation module 114 of the local machine 102 may, at step 238, invalidate the license data that was received at step 224 or optional step 230 in order to prevent continued access to the software application 112.

Continuing with the above example, where the newly-collected machine configuration information indicates that the operating system 110 has been upgraded since the time of the software activation from a lower-priced operating system to a higher-priced operating system, and the mapping in the activation rules 120 that were received at step 224 or optional step 230 indicate that the product key is authorized for the prior lower-priced operating system but is not authorized for the current higher-priced operating system, then the activation module 114 of the local machine 102 may, at decision step 234, determine that the license data is no longer valid for the newly-collected machine configuration information of the local machine 102, and may, at step 238 invalidate the license data that was received at step 224 or optional step 230 in order to prevent continued access by any user to the software application 112 on the local machine 102.

Continuing with the above examples, by the conclusion of step 236 or step 238, it will be determined whether the product key remains valid for the present configuration of the local machine 102 on which the software application 112 is installed, and continued access to the software application 112 will either be reauthorized or denied. Where the product key remains valid, the license data received by the local machine 102 at the time of software activation is revalidated, and otherwise the license data is invalidated. In this manner, the example methods disclosed herein can employ the activation rules 120 that were current at the time of the software activation, or in some embodiments even more current, to revalidate or invalidate license data, thus preventing an originally valid license from subsequently being employed by a user in an unauthorized manner.

Subsequently, the method 200 may also periodically include additional iterations of optional steps 228-232 in order to periodically update the activation rules 120 stored at the local machine 102. For example, each time the activation rules 120 are updated at the remote activation server 104, optional steps 228-232 may be performed in order to download a current copy of the activation rules 120 to the local machine for use in revalidation of the software application 112. Also, the method 200 may periodically include additional iterations of steps 234-238 in order to periodically revalidate the license data of the installed software application 112. For example, each time that the software application 112 is executed, steps 234-238 may be performed to revalidate or invalidate the license data in light of any changes to the configuration of the local machine 102.

The embodiments described herein may include the use of a special-purpose or general-purpose computer including various computer hardware or software modules or filters, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for software activation and revalidation, the method comprising:
   collecting machine configuration information from a machine on which a software application has been at least partially installed;
   sending the machine configuration information and a product key to an activation server;
   applying, at the activation server, activation rules stored at the activation server to determine whether the product key is valid for the machine configuration information, the activation rules having been updated since the release of the software application to account for new or updated software or hardware with which the software application is configured to be employed;
   if the product key is valid for the machine configuration information, activating the software application by sending, from the activation server to the machine, license data that authorizes access to the software application and that contains the updated activation rules; and
   periodically applying, at the machine, the updated activation rules contained in the license data to newly-collected machine configuration information from the machine to determine whether the product key remains valid for the newly-collected machine configuration information and, if the product key remains valid for the newly-collected machine configuration information, revalidating, at the machine, the license data to authorize continued access to the software application.

2. The method as recited in claim 1, wherein the machine is a physical computer.

3. The method as recited in claim 1, wherein the machine is a virtual machine.

4. The method as recited in claim 1, wherein the machine configuration information includes information regarding the operating system installed on the machine.

5. The method as recited in claim 4, wherein applying, at the activation server, the activation rules includes applying, at the activation server, the activation rules stored at the activation server to determine whether the product key is valid for the operating system installed on the machine.

6. The method as recited in claim 1, wherein the license data is a signed license file to prevent a user of the machine from undetectably altering the updated activation rules contained in the signed license file.

7. The method as recited in claim 1, further comprising:
   periodically reupdating the activation rules stored at the activation server; and
   resending, from the activation server to the machine, the license data after each periodic reupdate, the license data containing the reupdated activation rules.

8. The method as recited in claim 1, wherein if the product key is invalid for the newly-collected machine configuration information, invalidating the license data to prevent continued access to the software application.

9. The method as recited in claim 1, wherein sending the machine configuration information and the product key to the activation server includes sending the machine configuration information and the product key to the activation server via an intermediate computer.

10. The method as recited in claim 1, wherein sending the license data from the activation server to the machine includes sending the license data from the activation server to the machine via an intermediate computer.

11. One or more non-transitory computer-readable media storing one or more programs that causes one or more processors to execute a method for software activation and revalidation, the method comprising:
   collecting machine configuration information from a machine on which a software application has been at least partially installed;
   sending the machine configuration information and a product key to an activation server;
   applying, at the activation server, activation rules stored at the activation server to determine whether the product key is valid for the machine configuration information, the activation rules having been updated since the release of the software application to account for new or updated software or hardware with which the software application is configured to be employed;
   if the product key is valid for the machine configuration information, activating the software application by sending, from the activation server to the machine, license data that authorizes access to the software application and that contains the updated activation rules; and
   periodically applying, at the machine, the updated activation rules contained in the license data to newly-collected machine configuration information from the machine to determine whether the product key remains valid for the newly-collected machine configuration information and, if the product key remains valid for the newly-collected machine configuration information, revalidating, at the machine, the license data to authorize continued access to the software application.

12. A method for software activation and revalidation, the method comprising:

collecting machine configuration information from a local machine on which a software application has been at least partially installed;

sending the machine configuration information and a product key to a remote activation server;

applying, at the remote activation server, activation rules stored at the remote activation server to determine whether the product key is valid for the machine configuration information, the activation rules having been updated since the release of the software application to account for new or updated software or hardware with which the software application is configured to be employed;

if the product key is valid for the machine configuration information, activating the software application by sending, from the remote activation server to the local machine, a signed license file that authorizes access to the software application and that contains the updated activation rules, the signing of the signed license file configured to prevent a user of the local machine from undetectably altering the updated activation rules contained in the signed license file; and periodically applying, at the local machine, the updated activation rules contained in the signed license file to newly-collected machine configuration information from the local machine to determine whether the product key remains valid for the newly-collected machine configuration information and, if the product key remains valid for the newly-collected machine configuration information, revalidating, at the local machine, the signed license file to authorize continued access to the software application.

13. The method as recited in claim 12, wherein:

the machine configuration information includes information regarding the operating system installed on the local machine; and applying, at the remote activation server, the activation rules includes applying, at the remote activation server, the activation rules stored at the remote activation server to determine whether the product key is valid for the operating system installed on the local machine.

14. The method as recited in claim 13, further comprising:

upgrading, subsequent to the activation of the software application, the operating system installed on the local installation computer to a different operating system; and invalidating the signed license file after the upgrade of the operating system to prevent continued access to the software application because the product key is invalid for the different operating system.

15. The method as recited in claim 12, further comprising:

periodically reupdating the activation rules stored at the remote activation server; and resending, from the remote activation server to the local machine, the signed license file after each periodic reupdate, the signed license file containing the reupdated activation rules.

16. The method as recited in claim 12, wherein sending the machine configuration information and the product key to the remote activation server includes sending the machine configuration information and the product key to the remote activation server via an intermediate local computer.

17. The method as recited in claim 12, wherein sending the signed license file from the remote activation server to the local machine includes sending the signed license file from the remote activation server to the local machine via an intermediate local computer.

18. The method as recited in claim 12, wherein periodically applying, at the local machine, the updated activation rules contained in the signed license file includes applying, at the local machine, the updated activation rules contained in the signed license file each time that the software application is executed.

19. The method as recited in claim 12, wherein if the product key is invalid for the newly-collected machine configuration information, invalidating the signed license file to prevent continued access to the software application.

20. One or more non-transitory computer-readable media storing one or more programs that causes one or more processors to execute a method for software activation and revalidation, the method comprising:

collecting machine configuration information from a local machine on which a software application has been at least partially installed;

sending the machine configuration information and a product key to a remote activation server;

applying, at the remote activation server, activation rules stored at the remote activation server to determine whether the product key is valid for the machine configuration information, the activation rules having been updated since the release of the software application to account for new or updated software or hardware with which the software application is configured to be employed;

if the product key is valid for the machine configuration information, activating the software application by sending, from the remote activation server to the local machine, a signed license file that authorizes access to the software application and that contains the updated activation rules, the signing of the signed license file configured to prevent a user of the local machine from undetectably altering the updated activation rules contained in the signed license file; and periodically applying, at the local machine, the updated activation rules contained in the signed license file to newly-collected machine configuration information from the local machine to determine whether the product key remains valid for the newly-collected machine configuration information and, if the product key remains valid for the newly-collected machine configuration information, revalidating, at the local machine, the signed license file to authorize continued access to the software application.

* * * * *